W. E. P. MEIER.
HOG SCRAPING MACHINE.
APPLICATION FILED MAR. 19, 1910.

1,024,412.

Patented Apr. 23, 1912.

Witnesses:

Inventor,
W. E. P. Meier

UNITED STATES PATENT OFFICE.

WILLI E. P. MEIER, OF GRENAA, DENMARK.

HOG-SCRAPING MACHINE.

1,024,412.  Specification of Letters Patent.  Patented Apr. 23, 1912.

Application filed March 19, 1910. Serial No. 550,520.

*To all whom it may concern:*

Be it known that I, WILLI EMIL POUL MEIER, manufacturing engineer, a subject of the King of Denmark, residing at Grenaa, Denmark, have invented a Hog-Scraping Machine, of which the following is a full, clear, and exact description, reference being had to the accompanying drawings, forming a part hereof.

This invention has regard to a machine by means of which the hair or bristles are scraped off the scalded carcasses of swine.

The machine is placed at the end of the scalding vat, and the carcass is passed straight from the vat through the machine.

By using this machine a great deal of labor and time is saved, as the machine served by one man completely removes the hair in about 25 seconds.

Figure 1:
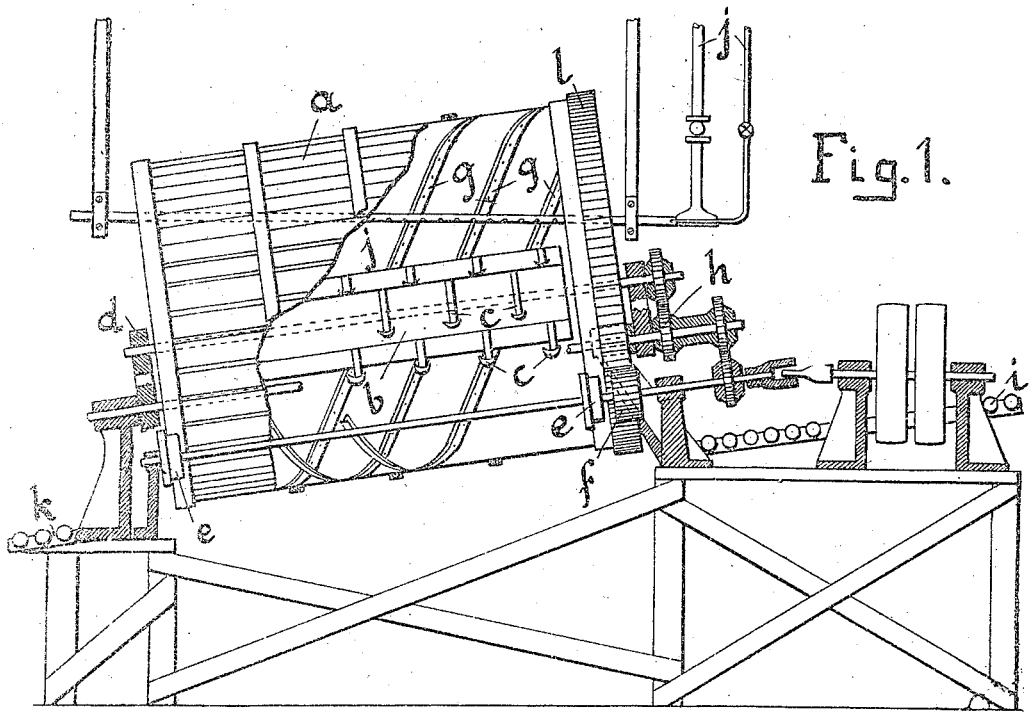
Figure 2:
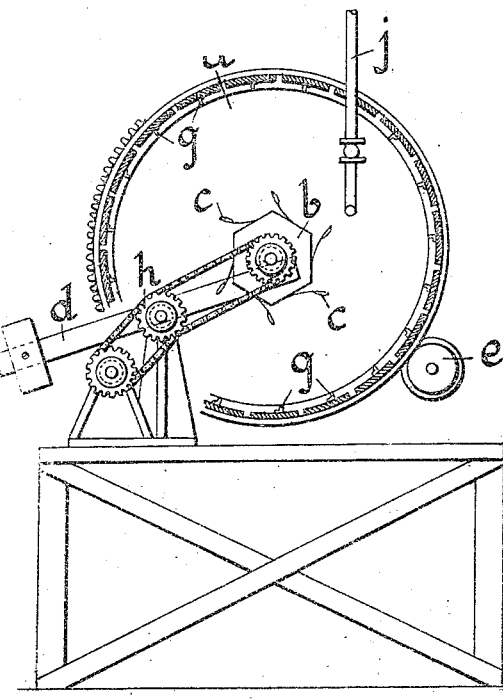

The drawing shows: Figure 1 the machine seen from the side with part of the large drum cut away, and Fig. 2 the machine seen from the end, pulleys and universal joint having been removed.

The large drum $a$, which rests on rollers $e$ is started rotating by the cog wheel $f$ acting on a spur-wheel $l$, which lies around the drum in such a manner, that it holds together the wooden battens, of which the drum is composed. Inside the drum a number of angle irons $g$ forming parallel ribs, are arranged. These angle irons give a rotary motion to the carcass and at the same time guide it through the drum. While the carcass is passing through the drum, it is scraped by a number of semi-circular scrapers $c$ (60 for example) of galvanized plates, each of which is attached to a spring, which again is fastened to a hexagonal roller $b$, that is set rotating by a system of chain wheels. The scraping roller and its scrapers rest upon the carcass under a variable pressure, the roller being balanced by means of two two-armed levers $d$ furnished with a sliding weight, and which turn around the axle of the chain wheel $h$.

The machine is used in the following way: The scalded carcass slides from the roller table $i$, into the large drum, which revolves 25 times a minute, and comes under the scraping roller $b$, which rotates in the contrary direction at a speed of 150 revolutions a minute. The rib-shaped angle irons $g$ turn the carcass around, but the carcass always remains at the bottom of the large drum and is acted upon by the spring scrapers $c$. During the whole process, which lasts about 25 seconds, the carcass is played upon by water and steam from the pipe $j$, which is furnished with holes. The carcass then slides out on to another roller table $k$ and is finished.

Having now fully described my invention, what I claim and desire to secure by Letters Patent is:

A hog scraping machine, comprising an inclined rotatable drum, spirally arranged ribs on the inside thereof, a roller inside of said drum supported by the counterbalanced arms, said roller having its axis parallel to the axis of said drum, spring scrapers fitted on said roller, means for rotating the drum in one direction, means for rotating the roller in the other direction, means for feeding the carcass through the drum past the scraping roller, and means for discharging water and steam upon the carcass during the scraping operation, substantially as set forth.

In testimony whereof I affix my signature in presence of two witnesses:

W. E. P. MEIER.

Witnesses:
C. HENSEN,
J. C. STARK PETERSEN.